(12) United States Patent
Grant

(10) Patent No.: US 6,530,434 B1
(45) Date of Patent: Mar. 11, 2003

(54) FARRIER HAMMER

(76) Inventor: Roger H. Grant, 15506 S. Harvard, Bixby, OK (US) 74008

( * ) Notice: Subject to any disclaimer, the term of this patent is extended or adjusted under 35 U.S.C. 154(b) by 0 days.

(21) Appl. No.: 09/777,035

(22) Filed: Feb. 5, 2001

(51) Int. Cl.[7] ............................................... A01L 11/00
(52) U.S. Cl. ............................................................ 168/45
(58) Field of Search ............................ 168/45; 81/20–27

(56) References Cited

U.S. PATENT DOCUMENTS

| | | | |
|---|---|---|---|
| RE6,623 E | | 8/1875 | Parker |
| 177,386 A | | 5/1876 | Ely |
| 429,508 A | * | 6/1890 | Crane .......................... 254/26 R |
| 585,123 A | | 6/1897 | Severance |
| 822,066 A | * | 5/1906 | Morkert ............................ 7/131 |
| 839,474 A | * | 12/1906 | Guinter ..................... 254/26 R |
| 1,108,766 A | | 8/1914 | Leavens |
| 2,239,719 A | * | 4/1941 | Jarrett ....................... 254/26 R |
| 3,640,324 A | | 2/1972 | Porter ............................. 81/20 |
| 3,760,656 A | * | 9/1973 | Veach ........................... 81/15.9 |
| 4,200,130 A | | 4/1980 | Reamy ............................ 81/20 |
| 4,240,478 A | | 12/1980 | Wilson ............................ 81/20 |
| 4,482,132 A | * | 11/1984 | Lamansky ................ 254/26 R |

* cited by examiner

Primary Examiner—Peter M. Poon
Assistant Examiner—Son T. Nguyen
(74) Attorney, Agent, or Firm—Head Johnson and Kachigian

(57) ABSTRACT

An improved hammer for attaching a horseshoe to a hoof of a horse and having a head member at one end for driving a horsenail through the shoe and a portion of the horse's hoof and a uniquely shaped claw member at the opposite end which incorporates an essentially rectangularly shaped hiatus for wringing and severing the projecting end of a horsenail at the outer periphery of the horse's hoof and displacing the severed portion of the horsenail from the uniquely shaped hammer claw incorporating the rectangular shaped hiatus.

1 Claim, 1 Drawing Sheet

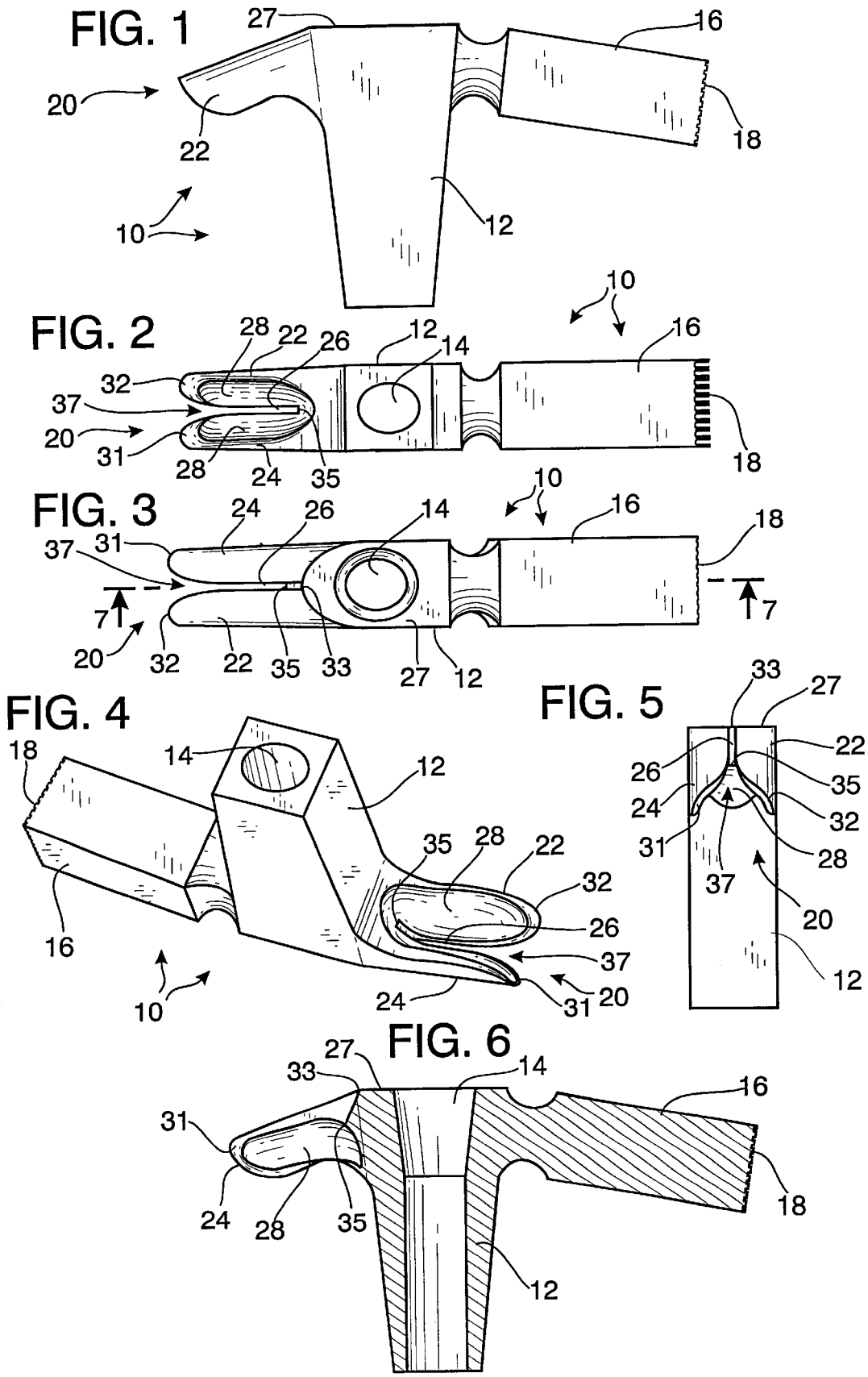

US 6,530,434 B1

FARRIER HAMMER

REFERENCE TO PENDING APPLICATIONS

This application is not related to any pending applications.

REFERENCE TO MICROFICHE APPENDIX

This application is not referenced in any microfiche appendix.

TECHNICAL FIELD OF THE INVENTION

This invention in general relates to an improved horse shoeing hammer and more particularly, but not limited to, an improved farrier hammer for driving a horse nail through a horse shoe and hoof of a horse and wringing and displacing the projecting end of the horsenail once so driven via a uniquely shaped hammer claw comprising a rectangular shaped hiatus.

BACKGROUND OF THE INVENTION

To secure a horse shoe to the hoof of a horse, a horsenail is driven through an appropriately dimensioned aperture in the horse shoe and through the outer portion of the horse's hoof. A farrier's hammer is normally utilized for driving the nail, and when the nail has been properly driven, the sharp or pointed outer end thereof typically projects from the hoof and must be removed in order to preclude interference with the walking or running of the horse. This projecting portion of the horsenail is often cut away through the use of side cutters, and other well known cutting tools. Most often, however, a farrier typically employs the claw portion of hammers of the present art to remove the projecting portion of the horsenail. In practice, the claw portion of existing farrier hammers incorporate a V-shaped tapered opening wherein the projecting portion of the nail is wedged into the narrowest fitting portion of said taper and the horsenail where because of the nails right-angled dimensions can be twisted off at the hoof. The repeated forcing of said shaped horsenails into the narrowest portion of the wedge-shaped opening of contemporary farrier hammers, in time, causes the claw portions of contemporary hammers to wedge apart and further distance themselves from one another. More importantly, this limitation of present art hammers allows for the twisted off portion of the projecting horsenails to remain lodged in the claw portion of the hammer. When so lodged, the farrier must take time away from the horse shoeing operation to manually displace said wedged horsenail portions or suffer the inefficient and ineffectual practices attendant to present art claw shaped horsenail removal means. Such inefficient removal via twisting of the projecting horsenail with present art hammers further risks damage to the horse's hoof. Consequently, the rough portion of the nail usually remains on the outer periphery of the hoof with the outer end of the nail being bent or otherwise damaged which further makes it difficult to remove the nail when it is necessary to remove the horse's shoe for any reason. Should the remaining portion of the nail be left unattended, it further presents a hazard to the horse, other horses or pedestrians making contact with the sharp edges of the projecting member of the portion of the nail.

Purported improvements to hammers are known and represented in the prior art. For example:

U.S. Pat. No. 6,623 issued on Aug. 31, 1875 to D. W. Parker discloses a improvement in claw-hammers.

U.S. Pat. No. 177,386 issued on May 16, 1876 to E. A. Ely discloses a hammer which will cut and clear a passage down by the sides of a nail and draw it out when the head has been driven into the wood.

U.S. Pat. No. 585,123 issued on Jun. 22, 1897 to A. W. Severance discloses a combination tool which can be used as a claw-hammer, a wrench for various kinds of nuts, for driving spikes and for various other purposes.

U.S. Pat. No. 1,108,766 issued on Aug. 25, 1914 to P. J. Leavens discloses a nail extracting claw in which the gripping jaws are provided with biting edges so as to adapt them to bite into and grip the cylindrical surface of the nail and not be dependent upon engagement beneath a head or enlargement of the nail.

U.S. Pat. No. 3,640,324 issued on Feb. 8, 1972 to Laurence W. Porter, subsequently assigned to Vaughan & Bushnell Mfg. Co. discloses a hammer head having an antislip and wear-resistant striking face surface. The forged steel hammer head including an impact head proper having a striking face on one end thereof is provided with a layer of tungsten carbide electrodeposited on the end, forming an outer surface on the striking face and penetrating the impact head proper, thereby providing an antislip and wear-resistant surface on the striking face.

U.S. Pat. No. 4,200,130 issued on Apr. 29, 1980 to John C. Reamy discloses a farrier's hammer for attaching a horse shoe to the hoof of a horse and having a head member at one end for driving the nail through the shoe and a portion of the hoof and a claw member at the opposite end for wringing the projecting end of the nail cleanly at the outer periphery of the hoof and ejecting the severed portion of the nail from the claw.

U.S. Pat. No. 4,240,478 issued on Dec. 23, 1980 to James F. Wilson discloses a compact hammer with recessed face and notched claw. The recess in one modification is formed by having four isosceles triangular slanted sections extending inward from the outer edge of the face. In another modification the face has a curved recess. The hammer head has flat exterior side surfaces and the head is positional close to the center line of the handle. The hammer claw has a rectangular notch between the two claw fingers, making the claw especially adaptable for disengaging tie-wire loops or bolt ends with slots in their outer ends. The hammer is useful for driving objects such as nails, pins, and wedges, and is especially useful in work involving concrete forms.

BRIEF SUMMARY OF THE INVENTION

The present invention contemplates a novel and improved farrier hammer for removing the projecting portion of a horsenail once a horse shoe has been attached to the hoof has been particularly designed and constructed for overcoming the foregoing disadvantage. The novel hammer comprises a main body portion having a central aperture or bore extending longitudinally for securing the hammer head to the usual handle and a head member having a working surface on the outer end thereof for driving the horsenail through the shoe and hoof in a usual and well known manner practiced by those skilled in the art. The present invention contemplates and teaches a unique and novel claw member which enhances the art, projects outwardly from the main body in an opposite direction from the head member and is of a particular hollow configuration for cooperating with the jaws of the claw to provide a clean and effective wringing, severing and displacing of the projecting portion of the horsenail. Said improved claw member incorporates, as distinguished from hammers of the present art, a uniquely designed rectangular opening appropriately sized to accommodate the square or rectangular shaped shank or shaft portion of a horsenail. Said improved rectangular shaped opening between the claws of the improved hammer allow for simple and efficient operation, and economical and durable repeated use of the improved farrier hammer absent limitations of present art hammers.

A major object of the instant invention is to provide an improved farrier hammer which allows for the clean and efficient twisting, severing and displacing of a projecting horsenail means once driven through a horse shoe and horse hoof.

Another object of the instant invention is to provide for an improved farrier hammer which presents an essentially rectangular hiatus to eliminate the V-shaped hiatus of contemporary hammers.

It is yet a further object of the instant invention to eliminate the wedging apart of hammer claws whenever one or more severed horsenails are wedged into the narrowest portion of the V-shaped hiatus associated with contemporary farrier hammers.

Other objects and further scope of the applicability of the present invention will become apparent from the detailed description to follow, taken in conjunction with the accompanying drawings wherein like parts are designated by like reference numerals.

DESCRIPTION OF THE DRAWINGS

FIG. 1 is a perspective view of a hammer embodying the invention and is taken from the inner side thereof.

FIG. 2 is a bottom view of the hammer shown in FIG. 1.

FIG. 3 is a top view of the hammer shown in FIG. 1.

FIG. 4 is a perspective view of the hammer shown in FIG. 1 and is taken from the outer side thereof.

FIG. 5 is an end elevational view of the hammer shown in FIG. 1, illustrating the claw member thereof.

FIG. 6 is a cross-sectional view of the hammer shown in FIG. 1.

DETAILED DESCRIPTION OF THE PREFERRED EMBODIMENT

While the making and using of various embodiments of the present invention are discussed in detail below, it should be appreciated that the present invention provides for inventive concepts capable of being embodied in a variety of specific contexts. The specific embodiments discussed herein are merely illustrative of specific maimers in which to make and use the invention and are not to be interpreted as limiting the scope of the instant invention.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is clear that many changes may be made in the details of construction, sequence of methodology step execution and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

Referring to the drawings in detail, and particularly FIGS. 1 through 6, reference numeral 10 generally indicates a farrier's hammer comprising a main body portion 12 having a bore 14 extending longitudinally there through for receiving the usual handle (not shown) therein. A head member 16 extends substantially radially outwardly from one side of the body 12 and is preferably integral therewith, but not limited thereto. The outer surface 18 of the head member 16 is a working surface and is preferably provided with a roughened, corrugated, or double-scored surface for a purpose as will be hereinafter a set forth. In addition, the cross-sectional configuration of the head 16 is preferably square, but not limited thereto.

A claw member generally indicated at 20 extends substantially radially outwardly from the body member 12 in an opposite direction with respect to the head member 16. The claw 20 comprises a pair of claw members 22, 24 spaced equal distance apart in a non-tapering manner by a hiatus 26 of substantially rectangular shaped configuration for receiving a projecting end of a horsenail therein. At the ending portions of said claw members 22, 24 the hiatus portion formed there between 37 deviates from its substantially rectangular shape. Said deviation in shape attributed to the generally curved ending portions 31, 32 of said claw members 22 and 24. The hiatus 26 is preferably provided with substantially sharp edges, and the width thereof is preferably carefully selected in accordance with the diametric size of horsenails (not shown) with which the hammer 10 is to be used. In accordance with the present invention as practiced in its preferred embodiment, the width of the hiatus falling within said pair of equally distance spaced claw members 22, 24 typically, though not limitedly, falls between 0.035 and 0.080 of an inch. In addition to extending radially from the body 12, the claws 22 and 24 are angularly and downwardly disposed with respect to the plane 27 of the top of the body 12 as viewed in FIGS. 1 and 6. The cross-sectional configuration of the claws 22 and 24 is substantially arcuate, providing a recess or hollow area 28 on the underside of the claws. This configuration facilitates the operation of the claws.

In use, the hammer 10 is suitably secured to the usual handle (not shown) for facilitating manipulation thereof in the usual manner for driving suitable nails (not shown) through the usual horse shoe (not shown) for attaching the horse shoe to the hoof (not shown) of a horse (not shown). The working surface 18 of the head member 16 is impinged repeatedly against the nail head in the usual manner for driving the nail through the horse shoe and hoof. The roughened configuration of the square working surface 18 substantially precludes any slippage of the head 16 from the nail during the driving operation, thus greatly reducing the time required for attaching the shoe to the hoof, as well as facilitating the operation.

When the shoe has been properly applied to the hoof, the sharp or pointed outer end of the nail normally protrudes beyond the outer periphery of the hoof, and must be removed. In order to wring the projecting portion of the nail, the claw portion 20 is disposed against the outer periphery of the hoof with the hiatus 26 between the claws 22 and 24 positioned in such a manner that the projecting portion of the nail is tightly engaged between the walls or edges of the hiatus. The hammer 10 is then manually rotated for moving the sharpened walls or edges of the hiatus 26 circumferentially around the outer periphery of the nail. Simultaneously with this movement, a twisting motion in a direction away from the hoof may be imparted to the claw portion 20. This results in a clean cutting of the nail substantially at the outer periphery of the hoof and removes the nail from the hoof. The uniquely presented essentially rectangular shaped hiatus of the instant invention 26 allows for rapid and automatic displacement of the horsenail from said hiatus immediately subsequent to the removal of the horsenail from the hoof.

When practiced in its full embodiment, the beginning uppermost portion of said hiatus 33 descends in an angular manner to a beginning lowermost portion of said hiatus 35 with said upper and lowermost hiatus portions 33 and 35 positioned opposite a non-edged or non-enclosed end of said hiatus 37.

From the foregoing it will be apparent that the present invention provides a novel farrier's hammer which is particularly designed for facilitating the driving of a nail through a horse shoe and horse hoof, and for wringing the protruding portion of the nail from the outer periphery of the hoof in a clean manner. The hammer head is provided with a roughened or cross-scored working surface which is substantially eliminates slippage of the working surface during a nail driving operation, and the claw portion is provided with a particularly configured hiatus which wrings the nail projection in a manner for producing a clean area surrounding the nail at the outer periphery of the hoof.

While this invention has been described to illustrative embodiments, this description is not to be construed in a limiting sense. Various modifications and combinations of the illustrative embodiments as well as other embodiments will be apparent to those skilled in the art upon referencing this disclosure. It is therefore intended that this disclosure encompass any such modifications or embodiments.

What is claimed is:

1. A farrier's hammer capable of removing the protruding end of horeshoe nail from the lateral side of a horse's hoof without causing divergence of the hammer's claw members comprising:

a handle having a top end and a bottom end;

a main body portion attached to said top end of said handle; said main body portion having a top, a bottom, a front, a back, a left side and a right side, and wherein said main body portion is tapered such that the top has at least a slightly greater surface area than the bottom;

a head portion extending outwardly at a slightly downward angle from the front of said main body portion near the top of the main body portion, said head portion being substantially parallelepiped in shape and being connected to said main body portion by an inwardly concave neck, and having a working surface provided on the outer end of the head portion for facilitating the driving of a horse nail through a horseshoe and a horse hoof such that a portion of the horseshoe nail is driven entirely through the horse hoof and protrudes outwardly from the lateral side of the horse hoof;

two claw members extending outwardly from said main body portion in a second direction;

wherein said claw members attach separately to said main body portion at separate positions on the back of said main body portion at a slightly downward angle, thereby providing for a hiatus in which claw members do not converge such that nails within said hiatus do not engage said claw members at a convergent point thereby causing said claw members to diverge outwardly and where said claw members remain parallel and spaced equidistantly apart in a rectangular shaped configuration for the entire length of the hiatus;

wherein said claw members are comprised of an inside edge, said inside edge being substantially sharp for facilitating the severing of the protruding portion of the nail; and wherein said claw members are comprised of a bottom being inwardly concave such that in conjunction the bottoms of the claw members have a parabolic shape; and wherein said claw members are equidistantly spaced for the entire length of the hiatus between 0.035 and 0.080 of an inch apart from one another.

\* \* \* \* \*